United States Patent
Droux et al.

(10) Patent No.: US 9,934,057 B2
(45) Date of Patent: Apr. 3, 2018

(54) SHADOW VNICS FOR THE CONTROL AND OBSERVABILITY OF IO VIRTUAL FUNCTIONS

(71) Applicant: Oracle International Corporation, Redwood Shores, CA (US)

(72) Inventors: Nicolas G. Droux, Rio Rancho, NM (US); Eric T. Cheng, San Mateo, CA (US); Leonid Grossman, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 121 days.

(21) Appl. No.: 14/257,240

(22) Filed: Apr. 21, 2014

(65) Prior Publication Data

US 2015/0301844 A1 Oct. 22, 2015

(51) Int. Cl.
*G06F 9/455* (2018.01)
(52) U.S. Cl.
CPC ............ *G06F 9/45558* (2013.01); *G06F 2009/45595* (2013.01)
(58) Field of Classification Search
CPC ....... G06F 9/45558; G06F 2009/45579; G06F 2009/45595
USPC .............................................................. 718/1
See application file for complete search history.

(56) References Cited

U.S. PATENT DOCUMENTS

| | | | |
|---|---|---|---|
| 2006/0206300 A1* | 9/2006 | Garg | G06F 9/45537 703/27 |
| 2008/0043756 A1* | 2/2008 | Droux | H04L 12/66 370/399 |
| 2010/0306358 A1* | 12/2010 | Droux | G06F 9/45537 709/223 |
| 2012/0002535 A1* | 1/2012 | Droux | H04L 45/245 370/216 |
| 2012/0005521 A1* | 1/2012 | Droux | G06F 11/2005 714/4.11 |

* cited by examiner

*Primary Examiner* — Li B Zhen
*Assistant Examiner* — Daniel Wei
(74) *Attorney, Agent, or Firm* — FBFK PC (57) ABSTRACT

A method for controlling a network interface controller (NIC). The method includes receiving, by a host operating system (OS) executing on a computer system, an instruction to map the NIC virtual function (VF) to a first virtual machine executing on the computer system. The method further includes allocating, according to the NIC VF, first NIC resources on a physical NIC operatively connected to the computer system, mapping the NIC VF to the first virtual machine, creating, in the host OS, a shadow virtual NIC for the first NIC resources allocated to the NIC VF, assigning the shadow virtual NIC to the first virtual machine, receiving, by the physical NIC, a first packet targeting the first virtual machine, and sending the first packet directly to the first virtual machine.

20 Claims, 6 Drawing Sheets

SHADOW VNICS FOR THE CONTROL AND OBSERVABILITY OF IO VIRTUAL FUNCTIONS

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic.

With advances in virtualization technology, computer systems may now include multiple concurrently executing operating systems. A host operating system may provide some control of the system NIC or a portion of NIC resources to a guest operating system. However, doing so may prevent the host operating system from controlling and/or monitoring the data sent and received by the guest operating system.

SUMMARY

In general, in one aspect, the invention relates to a non-transitory computer readable medium comprising instructions that, when executed by a processor, the method comprising receiving, by a host operating system (OS) executing on a computer system, an instruction to map a NIC virtual function (VF) to a first virtual machine executing on the computer system, allocating, according to the NIC VF, first NIC resources on a physical NIC operatively connected to the computer system, mapping the NIC VF to the first virtual machine, creating, in the host OS, a shadow virtual NIC for the first NIC resources allocated to the NIC VF, assigning the shadow virtual NIC to the first virtual machine, and receiving, by the physical NIC, a first packet targeting the first virtual machine, sending the first packet directly to the first virtual machine.

In general, in one aspect, the invention relates to, a method for controlling a network interface controller (NIC). The method includes receiving, by a host operating system (OS) executing on a computer system, an instruction to map the NIC virtual function (VF) to a first virtual machine executing on the computer system, allocating, according to the NIC VF, first NIC resources on a physical NIC operatively connected to the computer system, mapping the NIC VF to the first virtual machine, creating, in the host OS, a shadow virtual NIC for the first NIC resources allocated to the NIC VF, assigning the shadow virtual NIC to the first virtual machine, receiving, by the physical NIC, a first packet targeting the first virtual machine, and sending the first packet directly to the first virtual machine.

In general, in one aspect, the invention relates to a system comprising a physical network interface controller (NIC) comprising a plurality of NIC resources, a computer processor, a first virtual machine, and a host operating system (OS) executing on the computer processor configured to: receive an instruction to map a NIC VF to a first virtual machine, allocate, according to the NIC VF, first NIC resources of the plurality of NIC resources, map the NIC VF to the first virtual machine, create, in the host OS, a shadow virtual NIC for the first NIC resources allocated to the NIC VF, and assign the shadow virtual NIC to the first virtual machine, wherein the physical NIC is configured to: receive a first packet targeting the first virtual machine; and send the first packet directly to the first virtual machine.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for maintaining control of network interface controller (NIC) resources allocated to a guest operating system (OS) or virtual machine (VM). Specifically, embodiments of the invention may be used to create a shadow virtual network interface controller (VNIC) that provides an interface for a host OS to control and observe data transmitted using a virtual function (VF) mapped to a guest OS or virtual machine.

Figure 1:
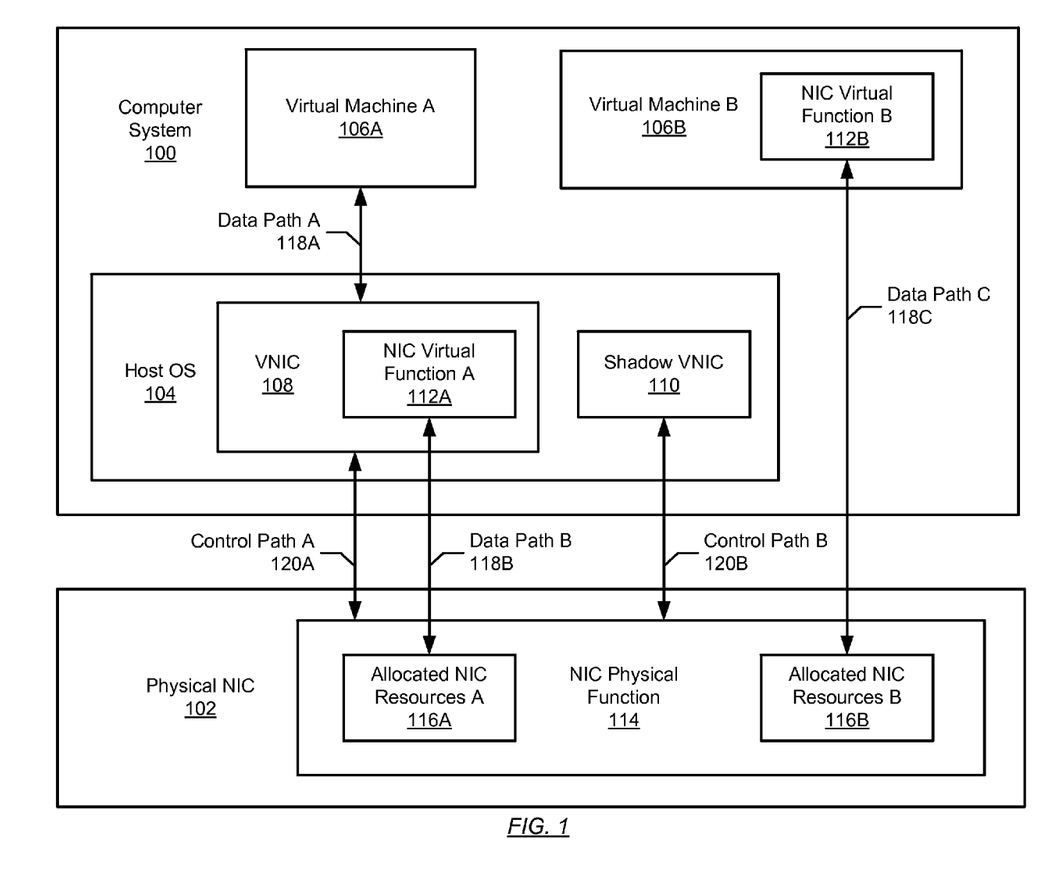
FIG. 1 shows a system in accordance with one or more embodiments of the invention.

FIG. 1 shows a diagram of a system in accordance with one or more embodiments of the invention. As shown in FIG. 1, the system includes a computer system (100) operatively connected to a physical NIC (102). The computer system (100) includes a host OS (104) and two virtual machines (virtual machine A (106A), virtual machine B (106B)). The host OS (104) includes a VNIC (108) and a shadow VNIC (110). The VNIC (108) includes NIC virtual function A (112A). Virtual machine B (106B) includes NIC virtual function B (112B). The physical NIC (102) includes NIC physical function (114), and the NIC physical function (114) includes allocated NIC resources A (116A) and allocated NIC resources B (116B).

As shown in FIG. 1, NIC virtual function A (112A) has been assigned to the VNIC (108) and mapped into the host OS (104) or VM (e.g., 106B). In one or more embodiments of the invention, outgoing data from virtual machine A (106A) is sent to the VNIC (108) via data path A (118A), and forwarded by the VNIC (108) via data path B (118B) to the allocated NIC resources A (116A) for transmission on the network (not shown). Similarly, in one or more embodiments of the invention, incoming data targeting (i.e., addressed to) virtual machine A (106A) is received from the network by the allocated NIC resources A (116A), sent to the VNIC (108) via data path B (118B), and forwarded to virtual machine A (106) via data path A (118A). The VNIC (108) may perform certain control and/or observation functions on the data sent along data path B (118B) using control path A (120A) to the NIC physical function (114).

As shown in FIG. 1, NIC virtual function B (112B) has been mapped to virtual machine B (106B). In one or more embodiments of the invention, outgoing data from virtual machine B (106B) is sent directly to the allocated NIC resources B (116B) via data path C (118C). Similarly, in one or more embodiments of the invention, incoming data targeting virtual machine B (106B) is received from the network by the allocated NIC resources B (116B) and sent directly to virtual machine B (106B) via data path C (118C). In one or more embodiments of the invention, the shadow VNIC (110) performs certain control and/or observation functions on the data sent along data path C (118C) using control path B (120B) to the NIC physical function (114).

In one or more embodiments of the invention, the computer system (100) is a group of hardware and software with functionality to execute the host OS (104) and the virtual machines (virtual machine A (106A), virtual machine B (106B)). In one or more embodiments of the invention, the host OS (104) is configured to provide functionality to create virtual execution environments (e.g., virtual machine A (106A), virtual machine B (106B)) in which the guest OSs may execute. Further, the host OS (104) may include functionality to manage the virtual machines (virtual machine A (106A), virtual machine B (106B)). Examples of host OSs include, but are not limited to, Solaris™ (Solaris™ is a trademark of Oracle America, Inc.), VMware® Server (VMware® a registered trademark of VMware, Inc.), and Xen® (Xen® is a trademark overseen by the Xen Project Advisory Board).

In one or more embodiments of the invention, the virtual machines (virtual machine A (106A), virtual machine B (106B)) are virtual execution environments that include functionality to execute operating systems (i.e., a guest OS) and/or applications. Further, each virtual machine (virtual machine A (106A), virtual machine B (106B)) may be isolated such that processes within one virtual machine (virtual machine A (106A), virtual machine B (106B)) may not communicate with other processes in other virtual machines. In addition, each virtual machine (virtual machine A (106A), virtual machine B (106B)) may be associated with a portion of the total hardware and processing resources of the computer system (100). As used here, virtual machines (virtual machine A (106A), virtual machine B (106B)) include, but are not limited to, Oracle® Virtual Machines.

In one or more embodiments of the invention, the physical NIC (102) provides an interface between the host (104) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components on the physical NIC (102) for processing, etc. Further, in one embodiment of the invention, the physical NIC (102) may include a direct memory access (DMA) engine (not shown), which includes functionality to transfer packets from the NIC to the host (100).

In one or more embodiments of the invention, the NIC physical function (114) includes functionally to manage the NIC resources (allocated NIC resources A (116A), allocated NIC resources B (116B)) on the physical NIC (102). The NIC physical function (114) may also include functionally to expose management controls to the computer system (100). In one or more embodiments of the invention, the NIC physical function (114) is communicatively coupled to one or more NIC virtual functions (NIC virtual function A (112A), NIC virtual function B (112B)).

In one or more embodiments of the invention, the NIC virtual functions (NIC virtual function A (112A), NIC virtual function B (112B)) are virtualized instances of the physical NIC (102) that expose NIC resources (or a subset of NIC resources) to higher-level processes on the computer system (100). The NIC virtual functions (NIC virtual function A (112A), NIC virtual function B (112B)) may be assigned to elements executing on the computer system (100), such as VNICs (e.g., VNIC (108)) and/or virtual machines (e.g., virtual machine A (106A), virtual machine B (106B)). Assigning a NIC virtual function (NIC virtual function A (112A), NIC virtual function B (112B)) provides the VNIC (108) and/or the virtual machines (e.g., virtual machine A (106A), virtual machine B (106B)) with control of NIC resources allocated to that NIC virtual function (allocated NIC resources A (116A), allocated NIC resources B (116B)). Further, the virtual functions (NIC virtual function A (112A), NIC virtual function B (112B)) enable virtual machines (virtual machine A (106A), virtual machine B (106B)) to transfer data directly from the physical NIC (102) into memory allocated for the virtual machine (i.e., without first copying the data into memory controlled by the host OS (104)).

In one or more embodiments of the invention, the allocated NIC resources (allocated NIC resources A (116A), allocated NIC resources B (116B)) are resources on the physical NIC (102) that may be assigned for control using the virtual functions (NIC virtual function A (112A), NIC virtual function B (112B)). Resources on the physical NIC (102) that may be allocated may include, for example, a microprocessor configured to execute software facilitating NIC functions, portions of memory within the NIC (102) used to temporarily store the received packets (e.g., hardware receive rings), available bandwidth, and/or an external network port.

In one or more embodiments of the invention, the VNIC (108) provides an abstraction layer between the NIC (102) and virtual machine A (106A). More specifically, the VNIC (108) operates like the physical NIC (102). For example, in one embodiment of the invention, the VNIC (108) is associated with one or more Internet Protocol (IP) addresses, one or more ports, and configured to handle one or more protocol types. Thus, while the host OS (104) may be operatively connected to a single physical NIC (102), virtual machines (e.g., virtual machine A (106A)) executing on the host OS (104) operate as if the host OS (104) is bound to multiple physical NICs. Said another way, multiple VNICs operate like a separate network device connected to the network. In one or more embodiments of the invention, communication and data functions are provided to virtual machine A (106A) via data path A (118A).

In one or more embodiments of the invention, data packets from virtual machine A (106A) are first copied from memory in virtual machine A (106A) to memory on the computer system (100) used by VNIC (108) via data path A (118A). The data packets are then prepared for transmission by VNIC (108) and copied to memory on the physical NIC (102) via data path B (118B).

In one or more embodiments of the invention, the VNIC (108) is configured for operation by the host OS (104). Specifically, the host OS (104) includes functionality to instantiate the VNIC (108) and configure the VNIC (108) to provide networking services to virtual machine A (106A) according to system policies and service-level agreements (SLAs) associated with virtual machine A (106). Functions available for the VNIC (108) configurable by the host OS (104) include, but are not limited to, bandwidth limitations, IP addresses, media access control (MAC) addresses, data observation, packet inspection, and packet filtering.

In one or more embodiments of the invention, the VNIC (112) services configuration and information requests from the host OS (104) by communicating with the NIC physical function (114) via control path A (120A). Such configuration and information requests may include changing the resources allocated to NIC virtual function A (112A) (i.e., altering the allocated NIC resources A (116A) and monitoring traffic sent and received by the allocated NIC resources A (116A).

In one or more embodiments of the invention, the VNIC (108) performs NIC-related operations using NIC virtual function A (112A) via data path B (118B). Such NIC-related operations include transmitting data to and from the physical NIC (102), applying and removing link-layer headers from data packets, and direct memory access (DMA) operations.

In one or more embodiments of the invention, the shadow VNIC (110) includes functionality to enable the host OS (104) to maintain the configurability and observability of a VNIC (e.g., VNIC (108)) and allow a virtual machine (e.g., virtual machine B (106B)) to utilize the benefits of a NIC virtual function (e.g., NIC virtual function B (112B)). Specifically, the host OS (104) may interact with the shadow VNIC (110) in the same or similar manner as the host OS (104) interacts with the VNIC (108).

In one or more embodiments of the invention, the host OS sends instructions to the VNIC (108) and shadow VNIC (110) to alter parameters of the allocated NIC resources (allocated NIC resource A (116A), allocated NIC resource B (116B)). Such parameters may include the kind and amount of resources in the allocated NIC resources (allocated NIC resource A (116A), allocated NIC resource B (116B)). Such parameters may also include the way in which data packets sent and received by the virtual machines (virtual machine A (106A), virtual machine B (106B)) are handled. For example, altering certain parameters may cause the VNIC (108) or shadow VNIC (110) to gather metrics about the data packets, filter a subset of data packets, and/or inspect data packets. In one or more embodiments of the invention, the altering the parameters may include changing a MAC address associated with the virtual machine.

In one or more embodiments of the invention, the shadow VNIC (110) communicates with the NIC physical function (114) via control path B (120B) to service configuration and information requests from the host OS (104). Further, by mapping NIC virtual function B (112B) directly to virtual machine B 106B, Virtual machine B (106B) may utilize the functionality of the NIC virtual function, such as configuring the resources within allocated NIC resources B (116B) and transferring data packets directly between memory in virtual machine B (106B) and memory on the physical NIC (102) via data path C (118C) (i.e., without first coping the data packets to other memory on computer system (100)).

Figure 2:
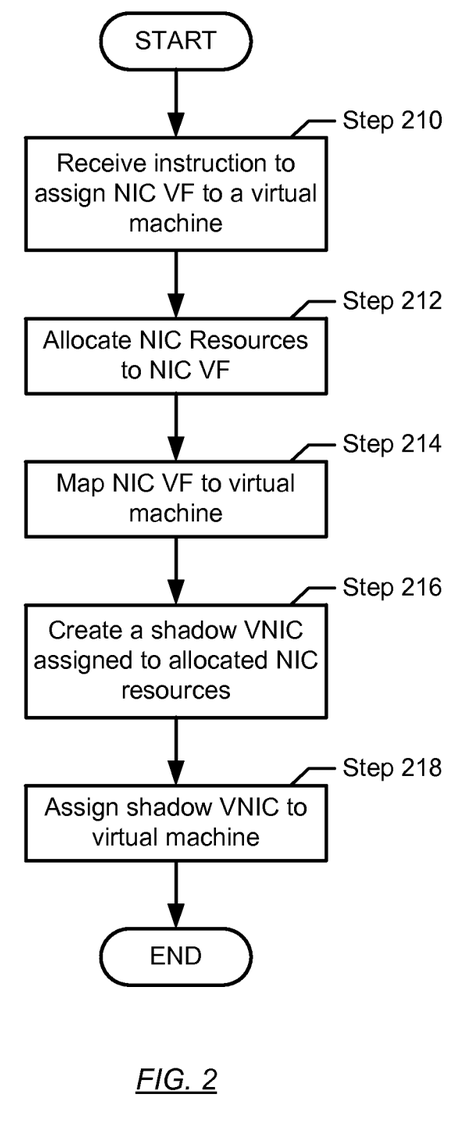
FIG. 2 shows a flow diagram in accordance with one or more embodiments of the invention.

FIG. 2 shows a flowchart for creating a shadow VNIC in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 210, the host OS receives an instruction to assign a NIC virtual function to a virtual machine. In one or more embodiments of the invention, the instruction is received from an operator of the host OS. In one or more embodiments of the invention, the instruction is received from an application executing on/or within the host OS.

In Step 212, the host OS allocates the NIC resources to a NIC virtual function. In one or more embodiments of the invention NIC resources are allocated to a NIC virtual function by communicating with the physical function on a physical NIC. In Step 214, the host OS maps the NIC virtual function to the virtual machine. In one or more embodiments of the invention, mapping the NIC virtual function to a virtual machine includes exposing an interface to the virtual machine to interact directly with a physical NIC (or a portion of a physical NIC).

In Step 216, the host OS creates a shadow VNIC assigned to the NIC resources allocated to the virtual machine. In one or more embodiments of the invention, assigning a shadow VNIC to NIC resources includes providing the shadow VNIC with an interface to interact with the NIC resources via a NIC physical function. In Step 218, the host OS assigns the shadow VNIC to the virtual machine. In one or more embodiments of the invention, assigning a shadow VNIC to a virtual machine includes creating an association within the host OS between the shadow VNIC and the virtual machine such that requests to alter, modify, or observe the VNIC assigned with the virtual machine are directed to the specific shadow VNIC.

Figure 3:
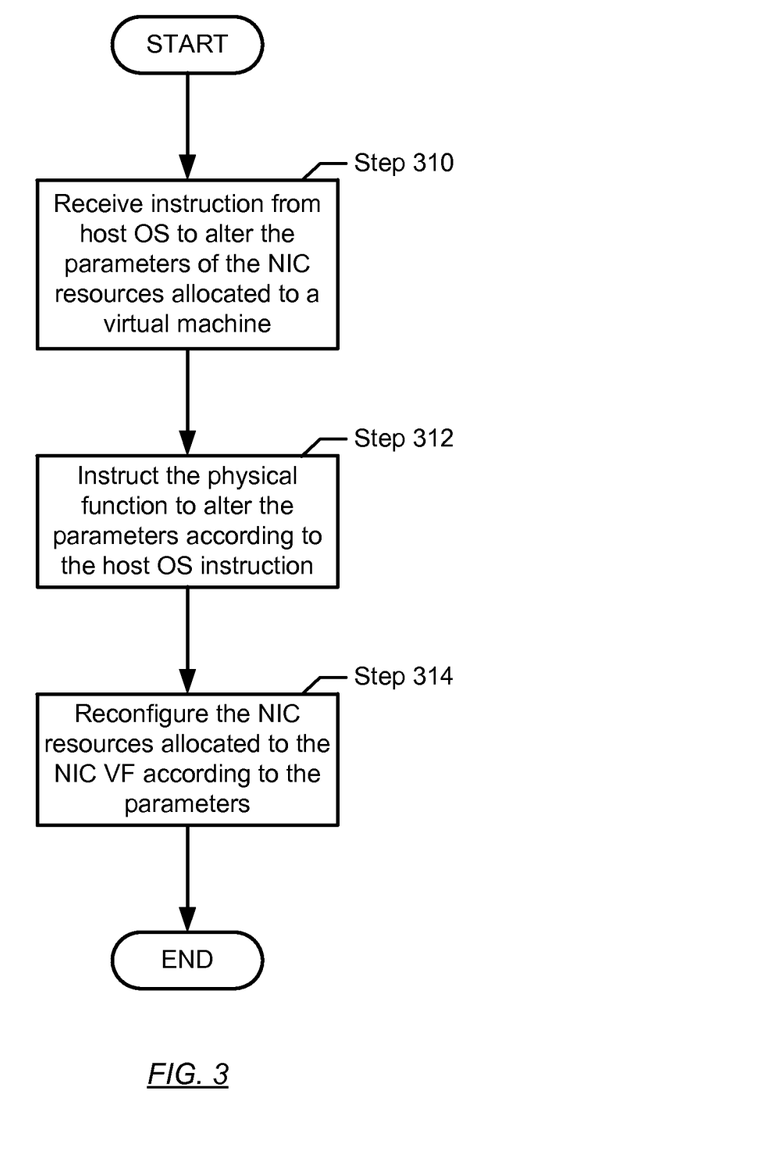
FIG. 3 shows a flow diagram in accordance with one or more embodiments of the invention.

FIG. 3 shows a flowchart for servicing requests from a host OS in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 310, the shadow VNIC receives an instruction from the host OS to alter the parameters of the NIC resources allocated to a virtual machine. In Step 312, the shadow VNIC instructs the NIC physical function to alter the parameters according to the host OS instructions. In Step 314, the NIC physical function alters the NIC resources allocated to the NIC virtual function according to the parameters received from the shadow VNIC. Once the NIC resources are altered, packets from the network targeting (i.e., addressed to) the virtual machine are processed according to the altered parameters and packets from the virtual machine targeting other systems are processed according to the altered parameters.

Figure 4A:
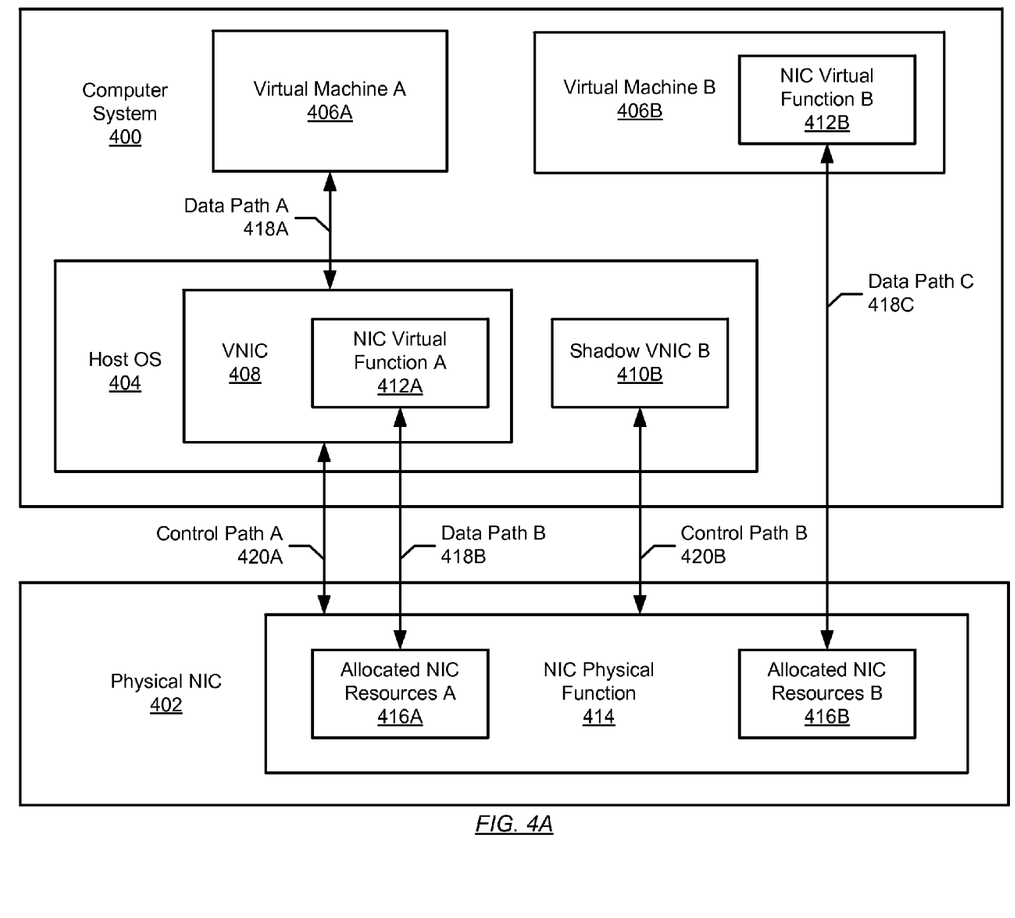
FIGS. 4A-4B show an example in accordance with one or more embodiments of the invention.
Figure 4B:
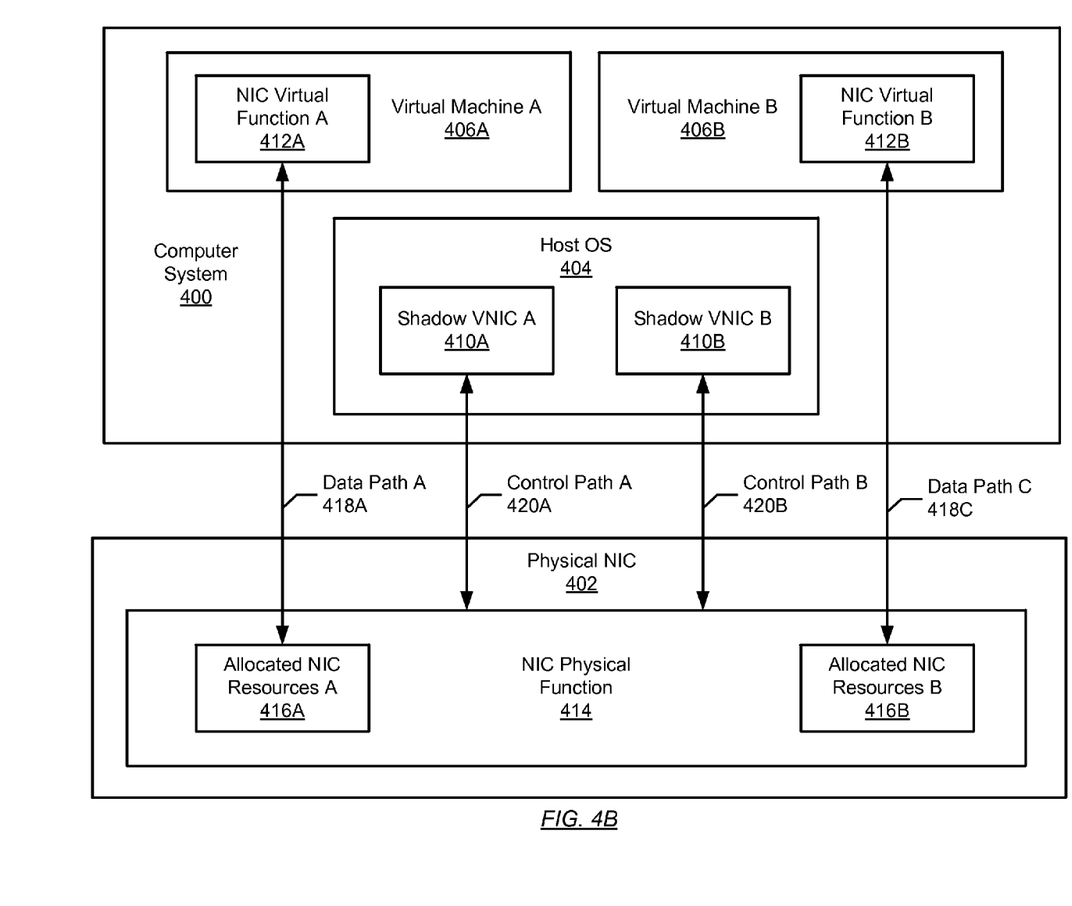

FIGS. 4A-4B show an example system in accordance with one or more embodiments of the invention. As shown in FIG. 4A, the example system includes computer system (400) operatively connected to a physical NIC (402). The computer system (400) includes a host OS (404) and two virtual machines (virtual machine A (406A), virtual machine B (406B)). The host OS (404) includes a VNIC (408) and a shadow VNIC B (410B). The VNIC (408) includes NIC virtual function A (412A). Virtual machine B (406B) includes NIC virtual function B (412B). The physical NIC (402) includes NIC physical function (414), and the NIC physical function (414) includes allocated NIC resources A (416A) and allocated NIC resources B (416B).

As shown in FIG. 4A, NIC virtual function A (412A) has been assigned to the VNIC (408). In one or more embodiments of the invention, outgoing data from virtual machine A (406A) is sent to the VNIC (408) via data path A (418A), and forwarded by the VNIC (408) via data path B (418B) to the allocated NIC resources A (416A) for transmission on the network (not shown). Similarly, in one or more embodiments of the invention, incoming data targeting (i.e., addressed to) virtual machine A (406A) is received from the network by the allocated NIC resources A (416A), sent to the VNIC (408) via data path B (418B), and forwarded to virtual machine A (406) via data path A (418A). The VNIC (408) may perform certain control and/or observation functions on the data sent along data path B (418B) using control path A (420A) to the NIC physical function (414).

For the purposes of the example, assume that allocated NIC resources A (416A) and allocated NIC resources B (416B) each include a single hardware receive ring (HRR A and HRR B, respectively). Assume that HRR A has been configured to receive packets targeting a specific MAC address (MAC A) and that HRR B has been configured to receive packets targeting a different MAC address (MAC B).

Assume that the physical NIC (402) receives a packet targeting MAC A. The physical NIC (402) provides the packet to allocated NIC resources A (416A) which in turn informs VNIC (408) (e.g., using a polling or interrupt mechanism) of the existence of the packet. Using functionality provided by NIC virtual function A (412A), the packet is then transferred via data path B (418B) into memory on the computer system (400) allocated to VNIC (408). Virtual machine A (406A) is notified of the packet and the packet is transferred into memory allocated for virtual machine A (406A) via data path A (418A).

Assume further that the physical NIC (402) receives a packet targeting MAC B. The physical NIC (402) provides the packet to allocated NIC resources B (416B) which in turn informs virtual machine B (406B) of the existence of the packet. Using functionality provided by NIC virtual function B (412B), the packet is then transferred via data path C (418C) into memory on the computer system (400) allocated to virtual machine B (406B).

Continuing with the example, assume that the host OS (404) receives an instruction to map NIC virtual function A (412A) directly to virtual machine A (406A). The host OS (404) assigns NIC virtual function A (412A) to virtual machine A (406A). As a result of assigning NIC virtual function A (412A) to virtual machine A (406A), VNIC (408) becomes shadow VNIC A (410A), where shadow VNIC A (410A) remains mapped to virtual machine A (406A). FIG. 4B shows the system of FIG. 4A after NIC virtual function A (412A) has been assigned to virtual machine A (06A).

Continuing with the example shown in FIG. 4B, assume that the host OS (404) has been instructed to allocate an additional HRR (HRR C) and assign an additional MAC address (MAC C) to virtual machine B (406B). The host OS (404) instructs shadow VNIC B (410B) to allocate an additional HRR (HRR C) and assign an additional MAC address (MAC C) to virtual machine B (406B). Using control path B (420B), shadow VNIC B (410B) instructs the NIC physical function (414) to allocate an additional HRR (HRR C) and assign an additional MAC address (MAC C) to allocated NIC resources B (416B). Once virtual machine B (406B) is notified of the addition, virtual machine B (406B) is free to utilize allocated NIC resources B (416B) (including the additional HRR C and MAC C). Assume that virtual machine B (406B) uses NIC virtual function B (412B) to configure allocated NIC resources B (416B) such that HRR B receives packets targeting MAC B and transmits those packets to a first virtual network stack on virtual machine B (406B) and HRR C receives packets targeting MAC C and transmits those packets to a second virtual network stack on virtual machine B (406B).

Figure 5:
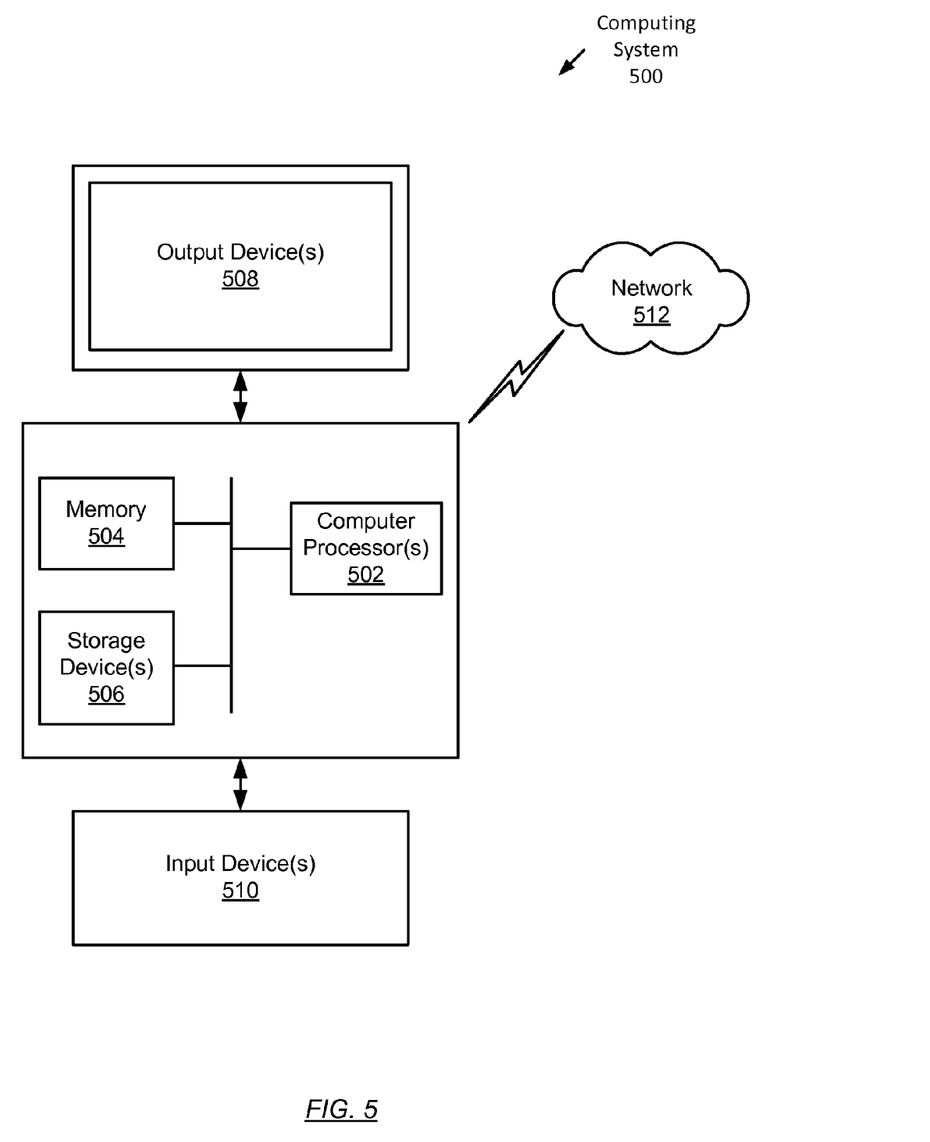
FIG. 5 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions that, when executed by a processor, cause a computer system to perform a method, the method comprising:
   receiving, by a host operating system (OS) executing on the computer system, an instruction to map a network interface card (NIC) virtual function (VF) to a first virtual machine executing on the computer system;
   allocating, according to the NIC VF, first NIC resources on a physical NIC operatively connected to the computer system;
   mapping the NIC VF to the first virtual machine to create a first NIC resources-to-first virtual machine data path;
   creating, in the host OS, a shadow virtual NIC for the first NIC resources allocated to the NIC VF to create a control path between the shadow virtual NIC and the first NIC resources;
   assigning the shadow virtual NIC to the first virtual machine by creating an association within the host OS between the shadow virtual NIC and the first virtual machine, wherein:
      the shadow virtual NIC is configured to perform control and observation functions for the first NIC resources-to-first virtual machine data path while a plurality of data packets data are being transmitted between the first NIC resources and the first virtual machine using the first NIC resources-to-first virtual machine data path, and
      the control and observation functions comprise functionality to filter a subset of the plurality of the data packets;
   receiving, by the physical NIC, a first data packet of the plurality of data packets targeting the first virtual machine; and
   sending the first data packet directly to the first virtual machine.

2. The non-transitory computer readable medium of claim 1, the method further comprising:
   receiving, by the shadow virtual NIC, parameters for the first NIC resources allocated to the NIC VF; and
   instructing, by the shadow virtual NIC, the physical NIC to apply the parameters,
   wherein the physical NIC alters the parameters of the first NIC resources allocated to the NIC VF based on the instructing.

3. The non-transitory computer readable medium of claim 1, the method further comprising:
   receiving, by a virtual NIC in the host OS, a second packet targeting a second virtual machine; and
   sending, by the virtual NIC, the second packet to the second virtual machine.

4. The non-transitory computer readable medium of claim 3, wherein the virtual NIC receives the second packet from second NIC resources allocated to the virtual NIC.

5. The non-transitory computer readable medium of claim 3, wherein the virtual NIC stores the second packet in memory allocated to the virtual NIC before transferring the second packet to memory allocated to the second virtual machine.

6. The non-transitory computer readable medium of claim 1, the method further comprising:
   configuring, by the first virtual machine using the NIC VF, the first NIC resources allocated to the NIC VF to obtain configured first NIC resources,
   wherein the first packet is sent directly to the first virtual machine using the configured first NIC resources.

7. The non-transitory computer readable medium of claim 1, the method further comprising:
   sending, by the first virtual machine, a second packet directly to the first NIC resources; and
   sending, to a network, the second packet from the first NIC resources.

8. A method for controlling a network interface controller (NIC), comprising:
   receiving, by a host operating system (OS) executing on a computer system, an instruction to map the NIC virtual function (VF) to a first virtual machine executing on the computer system;
   allocating, according to the NIC VF, first NIC resources on a physical NIC operatively connected to the computer system;
   mapping the NIC VF to the first virtual machine to create a first NIC resources-to-first virtual machine data path;
   creating, in the host OS, a shadow virtual NIC for the first NIC resources allocated to the NIC VF to create a control path between the shadow virtual NIC and the first NIC resources;
   assigning the shadow virtual NIC to the first virtual machine by creating an association within the host OS between the shadow virtual NIC and the first virtual machine, wherein:
      the shadow virtual NIC is configured to perform control and observation functions for the first NIC resources-to-first virtual machine data path while a plurality of data packets are being transmitted between the first NIC resources and the first virtual machine using the first NIC resources-to-first virtual machine data path, and
      the control and observation functions comprise functionality to filter a subset of the plurality of the data packets;
   receiving, by the physical NIC, a first data packet of the plurality of data packets targeting the first virtual machine; and
   sending the first data packet directly to the first virtual machine.

9. The method of claim 8, further comprising:
   receiving, by the shadow virtual NIC, parameters for the first NIC resources allocated to the NIC VF; and
   instructing, by the shadow virtual NIC, the physical NIC to apply the parameters,
   wherein the physical NIC alters the parameters of the first NIC resources allocated to the NIC VF based on the instructing.

10. The method of claim 8, further comprising:
    receiving, by a virtual NIC in the host OS, a second packet targeting a second virtual machine; and
    sending, by the virtual NIC, the second packet to the second virtual machine.

11. The method of claim 10, wherein the virtual NIC receives the second packet from second NIC resources allocated to the virtual NIC.

12. The method of claim 10, wherein the virtual NIC stores the second packet in memory allocated to the virtual NIC before transferring the second packet to memory allocated to the second virtual machine.

13. The method of claim 8, further comprising:
    configuring, by the first virtual machine using the NIC VF, the first NIC resources allocated to the NIC VF to obtain configured first NIC resources,
    wherein the first packet is sent directly to the first virtual machine using the configured first NIC resources.

14. The method of claim 8, further comprising:
sending, by the first virtual machine, a second packet directly to the first NIC resources; and
sending, to a network, the second packet from the first NIC resources.

15. A system comprising:
a physical network interface controller (NIC) comprising a plurality of NIC resources;
a computer processor;
a first virtual machine; and
a host operating system (OS) executing on the computer processor configured to:
receive an instruction to map a NIC virtual function (VF) to a first virtual machine;
allocate, according to the NIC VF, first NIC resources of the plurality of NIC resources;
map the NIC VF to the first virtual machine to create a first NIC resources-to-first virtual machine data path;
create, in the host OS, a shadow virtual NIC for the first NIC resources allocated to the NIC VF to create a control path between the shadow virtual NIC and the first NIC resources; and
assign the shadow virtual NIC to the first virtual machine by creating an association within the host OS between the shadow virtual NIC and the first virtual machine, wherein:
the shadow virtual NIC is configured to perform control and observation functions for the NIC VF-to-first virtual machine data path while a plurality of data packets are being transmitted between the NIC VF and the first virtual machine using the first NIC resources-to-first virtual machine data path, and
the control and observation functions comprise functionality to filter a subset of the plurality of the data packets wherein the physical NIC is configured to:
receive a first data packet of the plurality of data packets targeting the first virtual machine; and
send the first data packet directly to the first virtual machine.

16. The system of claim 15,
wherein the host OS comprises the shadow virtual NIC,
wherein the shadow virtual NIC is configured to:
receive parameters for the first NIC resources allocated to the NIC VF; and
instruct the physical NIC to apply the parameters, and
wherein the physical NIC alters the parameters of the resources allocated to the NIC VF based on the instructing.

17. The system of claim 15, further comprising:
a virtual NIC configured to:
receive a second packet targeting a second virtual machine; and
send the second packet to the second virtual machine.

18. The system of claim 17, wherein the virtual NIC receives the second packet from second NIC resources allocated to the virtual NIC.

19. The system of claim 15, wherein the first virtual machine is configured to:
configure, using the NIC VF, the first NIC resources allocated to the NIC VF to obtain configured first NIC resources,
wherein the first packet is sent directly to the first virtual machine using the configured first NIC resources.

20. The system of claim 15, wherein the first virtual machine is configured to send a second packet directly to the first NIC resources, and wherein the second packet is sent to a network from the first NIC resources.

\* \* \* \* \*

UNITED STATES PATENT AND TRADEMARK OFFICE
CERTIFICATE OF CORRECTION

PATENT NO. : 9,934,057 B2
APPLICATION NO. : 14/257240
DATED : April 3, 2018
INVENTOR(S) : Droux et al.

Page 1 of 1

It is certified that error appears in the above-identified patent and that said Letters Patent is hereby corrected as shown below:

In Column 7, Line 42, delete "(06A)." and insert -- (406A). --, therefor.

Signed and Sealed this
Eleventh Day of September, 2018

Andrei Iancu
*Director of the United States Patent and Trademark Office*